United States Patent
Qian et al.

(10) Patent No.: US 11,938,667 B2
(45) Date of Patent: Mar. 26, 2024

(54) SIDE-GATE INJECTION MOLDING APPARATUS AND SIDE-GATE HOT RUNNER NOZZLE

(71) Applicant: MOLD-MASTERS (2007) LIMITED, Georgetown (CA)

(72) Inventors: Jiping Qian, Oakville (CA); Beilei Yan, Mississauga (CA)

(73) Assignee: MOLD-MASTERS (2007) LIMITED, Georgetown (CA)

( * ) Notice: Subject to any disclaimer, the term of this patent is extended or adjusted under 35 U.S.C. 154(b) by 91 days.

(21) Appl. No.: 17/609,968

(22) PCT Filed: May 6, 2020

(86) PCT No.: PCT/CA2020/050609
§ 371 (c)(1),
(2) Date: Nov. 9, 2021

(87) PCT Pub. No.: WO2020/227817
PCT Pub. Date: Nov. 19, 2020

(65) Prior Publication Data
US 2022/0219363 A1 Jul. 14, 2022

Related U.S. Application Data

(60) Provisional application No. 62/846,206, filed on May 10, 2019.

(51) Int. Cl.
*B29C 45/27* (2006.01)

(52) U.S. Cl.
CPC ...... *B29C 45/2735* (2013.01); *B29C 45/2725* (2013.01); *B29C 45/2738* (2013.01);
(Continued)

(58) Field of Classification Search
CPC ........ B29C 45/2735; B29C 2045/2761; B29C 2045/2798
See application file for complete search history.

(56) References Cited

U.S. PATENT DOCUMENTS 6,669,462 B1  12/2003  Jenko
7,207,790 B2   4/2007  Trakas
(Continued)

FOREIGN PATENT DOCUMENTS

DE  10008471 A1  8/2001
DE  202007017136 U1  5/2009
(Continued)

OTHER PUBLICATIONS

International Search Report (ISA/210) for International Patent Application No. PCT/CA2020/050609 issued/mailed by the Canadian Patent Office dated Jul. 21, 2020.
(Continued)

*Primary Examiner* — Arrie L Reuther
*Assistant Examiner* — Virak Nguon
(74) *Attorney, Agent, or Firm* — Dinsmore & Shohl LLP

(57) ABSTRACT

Disclosed is a side-gate nozzle having a nozzle body, a nozzle tip and a transfer member. The nozzle body includes a heater, a longitudinally extending nozzle channel, and a bore extending from an exterior side wall of the nozzle body to the nozzle channel. The nozzle tip includes a tip member, a tip channel extending therethrough and a sealing member surrounding the tip member and in which the tip member is received. The transfer member seats against a step in the bore in the nozzle body and includes a bearing surface against which the nozzle tip is slidably seated and a transfer channel extending therethrough in fluid communication between the nozzle channel and the tip channel. In operation
(Continued)

thermal expansion of the transfer member along its length applies a sealing force against the nozzle tip.

17 Claims, 6 Drawing Sheets

(52) U.S. Cl.
CPC .............. *B29C 2045/2761* (2013.01); *B29C 2045/2798* (2013.01)

(56) References Cited

U.S. PATENT DOCUMENTS

| | | | |
|---|---|---|---|
| 7,510,393 B2 | 3/2009 | Glaesener et al. | |
| 8,821,151 B2 | 9/2014 | Overfield et al. | |
| 9,550,316 B2 | 1/2017 | Gunther et al. | |
| 2004/0071817 A1* | 4/2004 | Fischer | B29C 45/2711 425/564 |
| 2008/0279978 A1* | 11/2008 | Babin | B29C 45/2725 425/549 |
| 2009/0269430 A1* | 10/2009 | Catoen | B29C 45/2735 425/130 |
| 2011/0033570 A1 | 2/2011 | Braun | |
| 2015/0314508 A1* | 11/2015 | Tabassi | B29C 45/2725 425/547 |

FOREIGN PATENT DOCUMENTS

| | | |
|---|---|---|
| JP | S55-140537 A | 11/1980 |
| JP | S62-27123 A | 2/1987 |

OTHER PUBLICATIONS

Written Opinion of the International Searching Authority (ISA/237) for International Patent Application No. PCT/CA2020/050609 issued/mailed by the Canadian Patent Office dated Jul. 21, 2020.

* cited by examiner

SIDE-GATE INJECTION MOLDING APPARATUS AND SIDE-GATE HOT RUNNER NOZZLE

FIELD

The present relates to side-gate injection molding and more particularly, to a side-gate hot runner nozzle having a biased tip assembly.

BACKGROUND

A challenge associated with side-gate injection molding includes replacing a tip or tip assembly without cumbersome dismantling of the side-gate hot runner system. Another challenge associated with hot runner side-gate injection molding includes creating a fluid seal between the tip and the nozzle body if the tip is aligned with the mold cavity and the nozzle body is permitted to move or slide relative to the tip during thermal expansion of the nozzle.

SUMMARY

Embodiments hereof are directed towards a side-gate hot runner system, and a side-gate nozzle having a nozzle body, a nozzle tip and a transfer member. The nozzle body includes a heater, a nozzle channel extending longitudinally into the nozzle body, and a bore extending from an exterior side wall of the nozzle body to the nozzle channel. The nozzle tip includes a tip member, a tip channel extending through the tip member, and a sealing member in which the tip member is received. The transfer member is seated against a step in the bore in the nozzle body, the transfer member includes a bearing surface against which an abutment surface of the nozzle tip is slidably seated and a transfer channel extending therethrough which is in fluid communication between the nozzle channel and the tip channel. In operation thermal expansion of the transfer member along its length applies a sealing force against the abutment surface of the nozzle tip.

BRIEF DESCRIPTION OF DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention.

DETAILED DESCRIPTION OF THE DRAWINGS

Specific embodiments of the present invention are now described with reference to the figures, wherein like reference numbers indicate identical or functionally similar elements. The following detailed description is merely exemplary in nature and is not intended to limit the invention or the application and uses of the invention. In the following description, "downstream" is used with reference to the direction of mold material flow from an injection unit of an injection molding machine to a mold cavity of a mold of an injection molding system, and also with reference to the order of components or features thereof through which the mold material flows from the injection unit to the mold cavity, whereas "upstream" is used with reference to the opposite direction. Furthermore, there is no intention to be bound by any expressed or implied theory presented in the preceding field, background, summary or the following detailed description.

Figure 1:
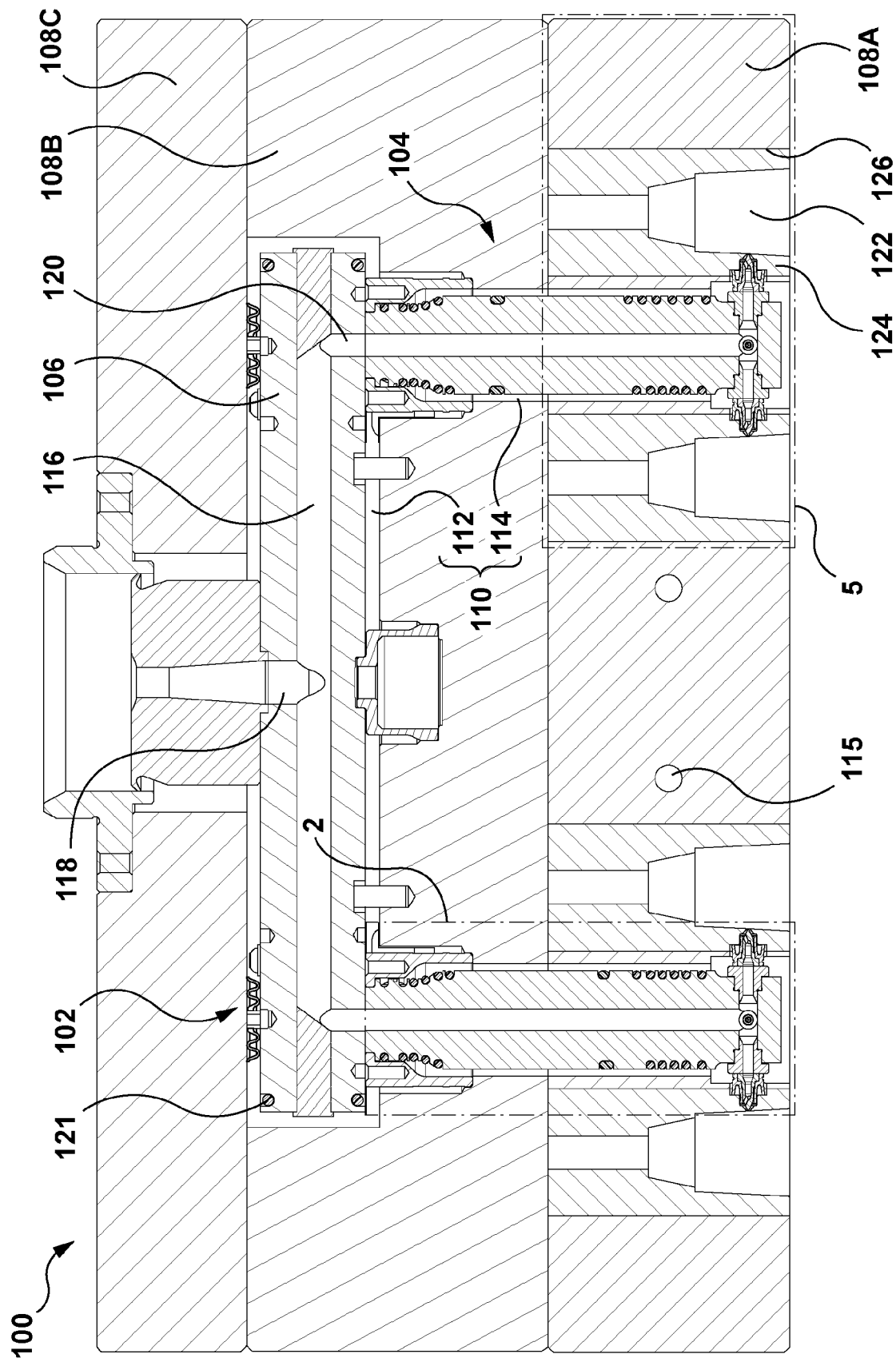
FIG. 1 is a sectional view of a side-gate hot runner injection molding apparatus having a side-gate hot runner system and a side-gate hot runner nozzle assembly in accordance with an embodiment of the present application.

FIG. 1 is a sectional view of an injection molding apparatus 100 having a hot runner system 102 and a side-gate hot runner nozzle 104 in accordance with a non-limiting embodiment of the present application. Hot runner system 102 includes a manifold 106 and side-gate hot runner nozzle 104 which, for brevity is referred to as nozzle 104. While two nozzles 104 are shown, injection molding apparatus 100 and hot runner system 102 can include other than two nozzles 104.

Injection molding apparatus 100 includes a plurality of mold plates, for example, a first mold plate 108A, a second mold plate 108B, and a third mold plate 108C (collectively referred to as mold plates 108) which form an enclosure 110 in which hot runner system 102 is received. Enclosure 110 includes a manifold chamber 112 which forms an insulating air gap around manifold 106 and a nozzle well 114 which forms an insulating air gap around nozzle 104. Mold plates 108 typically include cooling channels, such as cooling channel 115 called out on first mold plate 108A, through which cooling fluid is circulated to maintain injection molding apparatus 100 at a suitable molding temperature. Mold plates 108 are held together by fasteners (not shown), and may also include additional fastening/aligning components (not shown) such as guide pins, guide bushings etc. While three mold plates 108 are shown, injection molding apparatus 100 can include other than three mold plates 108.

Manifold 106 includes a manifold channel 116 that extends therethrough. Manifold channel 116 includes a manifold inlet 118 at its upstream end for receiving moldable material from a source. At its downstream end, manifold channel 116 includes an outlet 120 which is in fluid communication with nozzle 104. Manifold 106 further includes a manifold heater 121 for maintaining manifold 106 at a suitable processing temperature. Nozzle 104 delivers molding material to a mold cavity 122 that is located beside nozzle 104. Mold cavity 122 is defined at least in part by a mold cavity component, such as a cavity insert 124 that is received in a bore 126 in first mold plate 108A.

Figure 2:
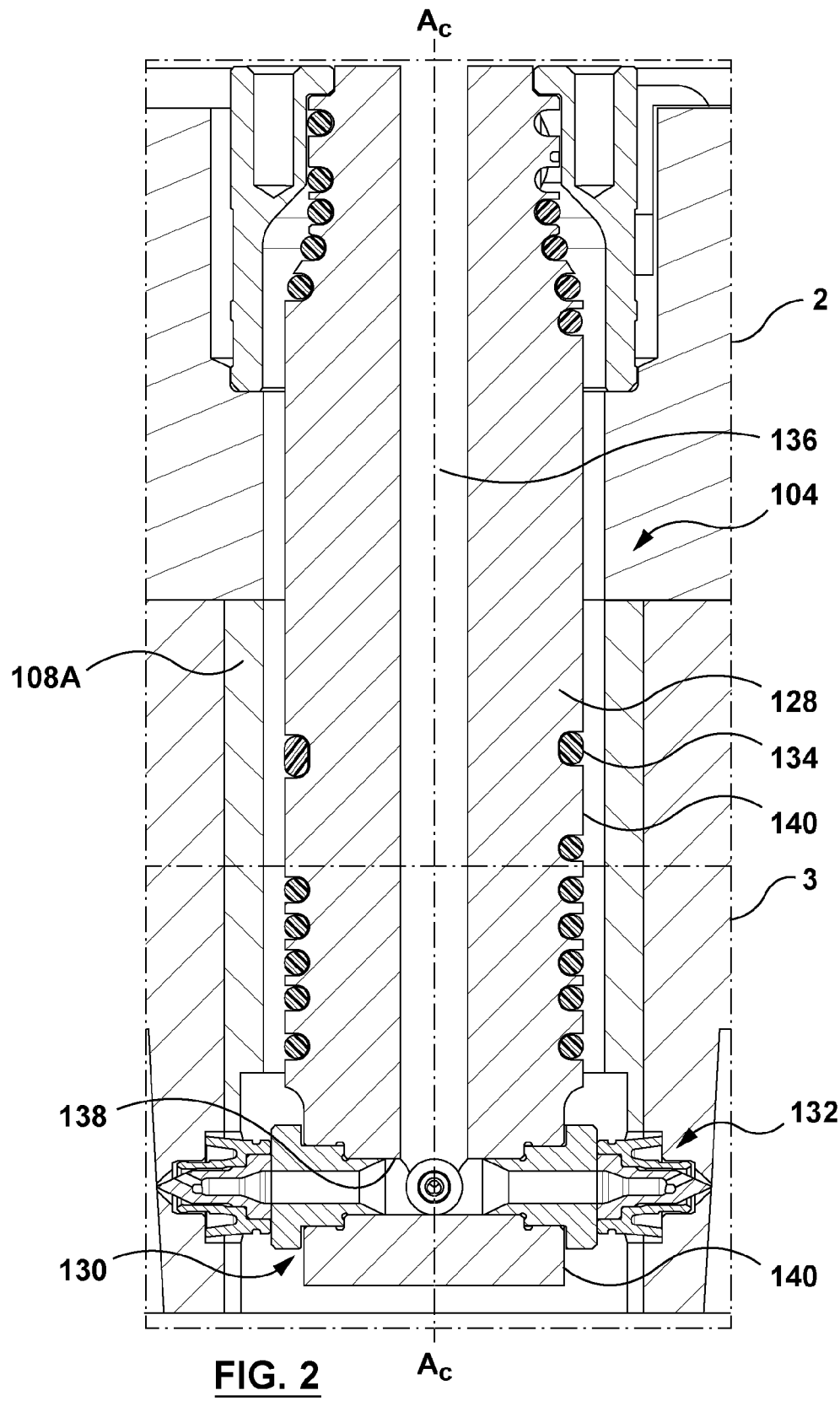
FIG. 2 is an enlarged view of a portion 2 of FIG. 1.

Referring to FIG. 2, which is an enlarged view of a portion 2 of FIG. 1, nozzle 104 includes a nozzle body 128, a transfer member 130, and a side-gate tip assembly 132, which can be referred to as tip assembly 132. Transfer member 130 is an intermediate component between nozzle 104 and tip assembly 132. Nozzle body 128 includes a heater 134 extending around nozzle body 128 and a nozzle channel 136 that extends longitudinally into nozzle body 128 from an upstream end thereof. Nozzle channel 136 receives molding material from manifold channel via manifold outlet 120. Nozzle body 128 further includes a bore 138 that extends laterally from an exterior side wall 140 of nozzle body 128 to nozzle channel 136. Although bore 138 is shown extending perpendicularly from a central axis $A_C$ of nozzle body 128, bore 138 can extend from central axis $A_C$ at an angle between 90° and 150°. Heater 134 provides heat to nozzle body 128 for maintaining nozzle 104 at a suitable processing temperature. Heater 134 also heats transfer member 130, which is received in bore 138 and is heated by way of contact with nozzle body 128. To facilitate heat transfer from nozzle body 128 to transfer member 130, transfer member 130 can be made from a material that is more thermally conductive than the material from which nozzle body 128 is made. An example of a suitable material for transfer member 130 includes a copper alloy. Examples of suitable materials for nozzle body 128 include H13 tool steel and 420 stainless steel. As shown, by way of example, heater 134 is a resistance wire heater that is embedded into nozzle body 128.

Figure 3:
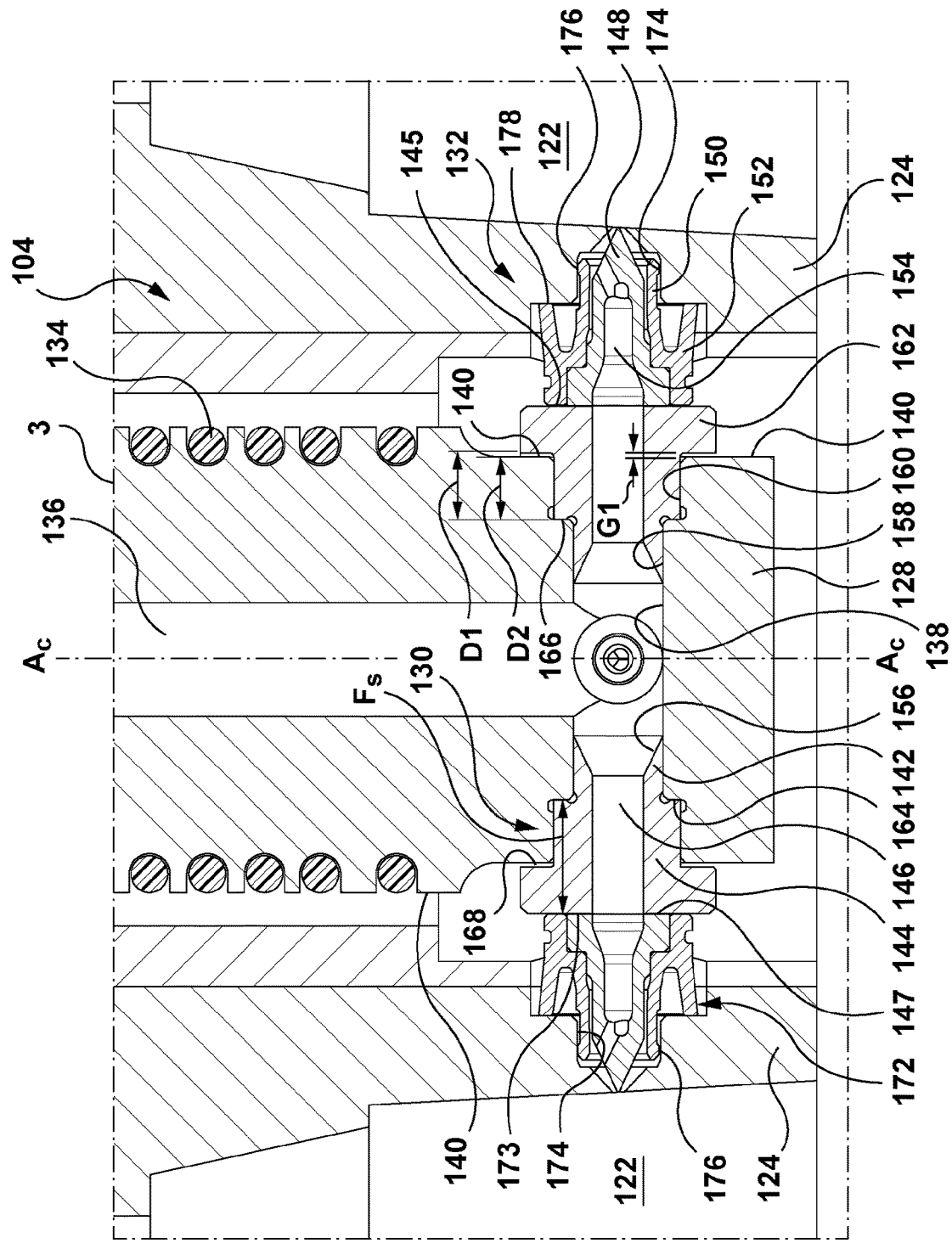
FIG. 3 is an enlarged view of a portion 3 of FIG. 2.

Referring to FIG. 3, which is an enlarged view of a portion 3 of FIG. 2, transfer member 130 includes an extension portion 142, a biasing portion 144 that extends radially outward from extension portion 142. A transfer channel 146, which is in fluid communication with nozzle channel 136, extends through biasing portion 144 and extension portion 142. Transfer member 130 further includes an external bearing surface 145 at a downstream end of transfer member 130 through which a sealing force $F_S$ is applied to tip assembly 132.

In the illustrated embodiment of FIGS. 1-3, transfer channel 146 includes a flared portion defined by an internal tapered surface 156 that expands radially outward in the upstream direction. In operation, melt pressure acts on internal tapered surface 156, which urges transfer member 130 towards tip assembly 132 to promote a fluid seal between bearing surface 145 and an abutment surface 147 at the upstream end of tip assembly 132. With transfer member 130 having internal tapered surface 156, increasing injection pressure increases the force at which transfer member 130 is pushed towards tip assembly 132. Melt pressure acting on internal tapered surface 156 can also expand extension portion 142 radially outward against bore 138 to promote a fluid seal between transfer member 130 and nozzle body 128 at the interface between extension portion 142 and bore 138.

Bore 138 includes a first lateral portion 158 and a second lateral portion 160. First lateral portion 158 is sized to receive extension portion 142 and second lateral portion 160 is sized to receive biasing portion 144. The fit between first lateral portion 158 and extension portion 142, and the fit between second lateral portion 160 and biasing portion 144 is sized to promote heat transfer from nozzle body 128 to transfer member 130 when injection molding apparatus 100 is in operation. Such fit can be a slide fit or other close fit which limits or prevents egress of molding material from between transfer member 130 and bore 138 when injection molding apparatus 100 is in operation, without impinging on longitudinal thermal expansion of transfer member 130. A configuration as such also helps to support transfer member 130 within bore 138 when cavity insert 124 and tip assembly 132 received therein are removed from the remainder of injection molding apparatus 100, for example to substitute tip assembly 132 with a replacement tip assembly 132. Also, as shown in the illustrated embodiment of FIGS. 1-3, transfer member 130 includes a flange 162 at its downstream end which may be useful to facilitate handling of transfer member 130, for example, during servicing of nozzle 104.

Continuing with FIG. 3, bore 138 includes a step 164 in nozzle body 128 against which transfer member 130 is seated. As nozzle 104 is heated to a processing temperature, thermal expansion of nozzle body 128 across its width moves step 164 away from central axis $A_C$, and as transfer member 130 and tip assembly 132 are heated they longitudinally expand away from central axis $A_C$ towards mold cavity 122. Thermal expansion of transfer member 130 against step 164 causes bearing surface 145 to press against abutment surface 147 of tip assembly 132 to promote a fluid seal between transfer member 130 and tip assembly 132. Step 164 is located between first lateral portion 158 and second lateral portion 160. Transfer member 130 includes a first shoulder 166 between extension portion 142 and biasing portion 144. First shoulder 166 seats against step 164 such that lengthwise thermal expansion of transfer member 130 between first shoulder 166 and bearing surface 145 creates sealing force $F_S$ against abutment surface 147, which urges tip assembly 132 away from nozzle body 128 and towards cavity insert 124. Sealing force $F_S$ increases with an increase in the temperature of transfer member 132. Sealing force $F_S$ when nozzle 104 is heated is also increased by increasing the cold condition length of transfer member 130 between first shoulder 166 and bearing surface 145. To assist in creating sealing force between transfer member 130 and tip assembly 132, transfer member 130 can be made from a material that has a greater coefficient of thermal expansion than the material from which nozzle body 128 is made.

Transfer member 130 further includes a second shoulder 168 between biasing portion 144 and flange 162. The longitudinal distance D1 between first shoulder 166 and second shoulder 168 is greater than the longitudinal distance D2 between step 164 in bore 138 and side wall 140 of nozzle body 128 where side wall 140 is overlapped by flange 162. In this configuration, when first shoulder 166 is seated against step 164, flange 162 is separated from side wall 140 by a gap G1 in which a tool may be inserted to assist with extracting transfer member 130 from bore 138, for example, if transfer member 130 requires servicing or replacing. Gap G1 also ensures first shoulder 166 is seated against step 164 rather than second shoulder 168 being seated against side wall 140.

As shown in in the illustrated embodiment of FIGS. 1-3, step 164 is perpendicular to first lateral portion 158 and second lateral portion 160, and first shoulder 166 is perpendicular to extension portion 142 and biasing portion 144. In this configuration, step 164 and first shoulder 166 are parallel to each other and perpendicular to the longitudinal thermal expansion direction of transfer member 130 which helps to promote sealing force between transfer member 130 and tip assembly 132.

Figure 4:
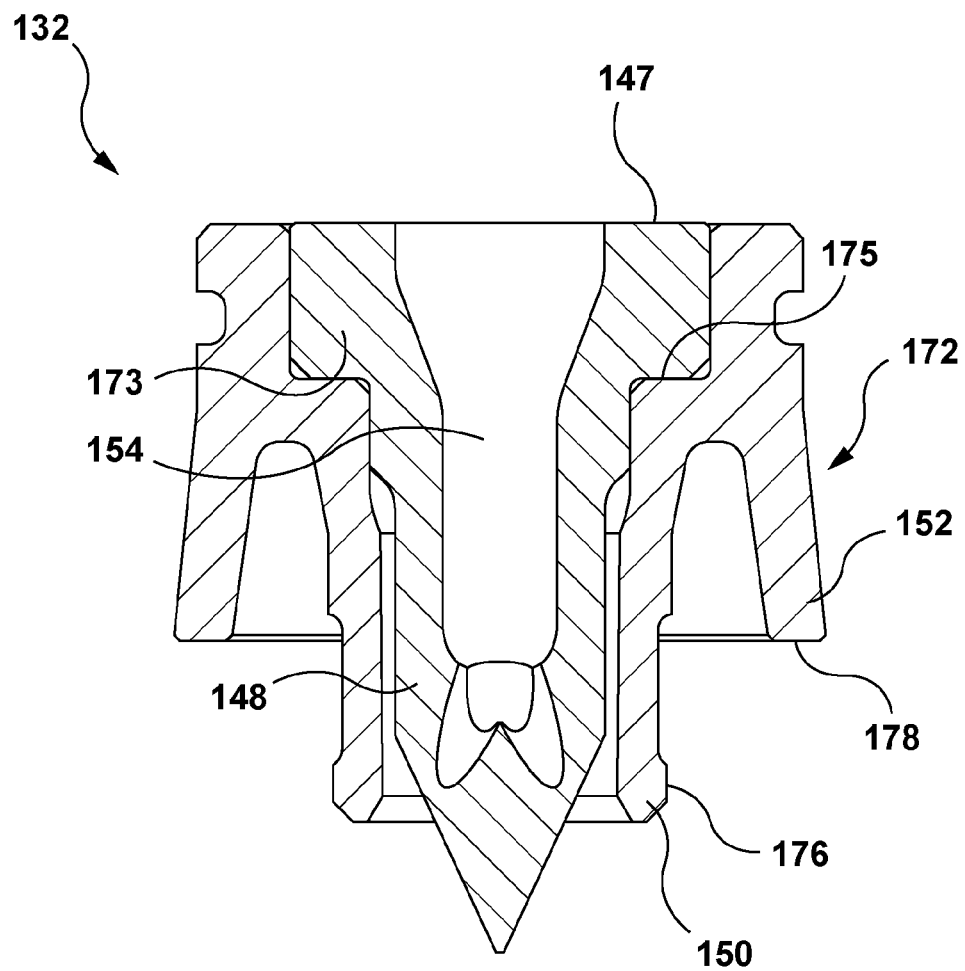
FIG. 4 is a sectional view of a side-gate tip assembly in accordance with an embodiment of the present application.

Continuing with FIG. 3 and referring to FIG. 4, which is a sectional view of tip assembly 132 in accordance with an embodiment of the present application. Tip assembly 132 receives molding material from transfer member 130 and delivers molding material to mold cavity 122. Tip assembly 132 includes a tip member 148, which is heated by way of contact with transfer member 130, and a sealing member 172 in which tip member 148 is received. Tip member 148 includes a tip channel 154 that extends through tip assembly 132 and is in fluid communication between transfer channel 146 and mold cavity 122. Abutment surface 147 of tip assembly 132 includes the upstream end of tip member 148. To facilitate heat transfer from transfer member 130 to tip member 148, tip member 148 can be made from a material having a thermal conductivity that is equal to or more than that of the material from which sealing member 172 is made. Examples of suitable materials for tip member 148 include a copper alloy and TZM molybdenum alloy. Examples of suitable materials for sealing member include H13 tool steel and a titanium alloy. Tip member 148 includes a tip member head 173 that seats against sealing member 172. In the illustrated embodiment of tip assembly 132, head 173 seats against a corresponding step 175 in the upstream end of sealing member 172. As tip member 148 is heated, tip member head 173 expands rearward from step 175 and against transfer member 130. To improve the sealing force between tip member 148 and transfer member 130, tip member 148 can be made from a material that has a greater coefficient of thermal expansion than that of the material from which sealing member 172 is made so that a thickness of tip member head 173 expands more than a depth of step 175.

Sealing member 172 includes a tubular portion 150 that surrounds tip member 148 and is received in a bore 174 in cavity insert 124. Tubular portion 150 includes a sealing surface 176 that forms a circumferential seal with bore 174. Sealing surface 176 can also align tip assembly 132 with mold cavity 122. Engagement between sealing surface 176 and bore 174 can be a slide fit, a light press-fit or an interference fit which can help couple tip assembly 132 to cavity insert 124. Alternatively, tip assembly 132 can be secured to cavity insert 124 by, for example, a separate retention member or a threaded connection therebetween. Sealing member 172 further includes a bracing surface 178 surrounding tubular portion 150 which is transverse to sealing surface 176. Bracing surface 178 is upstream from sealing surface 176 and supports tip assembly 132 against cavity insert 124 when thermal expansion of transfer member 130 applies sealing force $F_S$ against abutment surface 147. Bracing surface 178 optionally forms a face seal around bore 174 in cavity insert 124. In the illustrated embodiments shown herein, bracing surface 178 is the downstream end of a flange 152 that surrounds tubular portion 150.

In the illustrated embodiment of FIGS. 1-3, bearing surface 145 of transfer member 130 and abutment surface 147 of tip assembly 132 are parallel planar surfaces. This configuration allows transfer member 130, received in nozzle body 128, to move or slide relative to tip assembly 132 during longitudinal thermal longitudinal expansion of nozzle body 128, and also allows tip assembly 132 to be displaced laterally (downward in the page views of FIGS. 1-3) relative to transfer member 130 when cavity insert 124 having tip assembly 132 installed therein is removed from an otherwise assembled injection molding apparatus 100, for example as discussed below with regard to FIG. 5.

Figure 5:
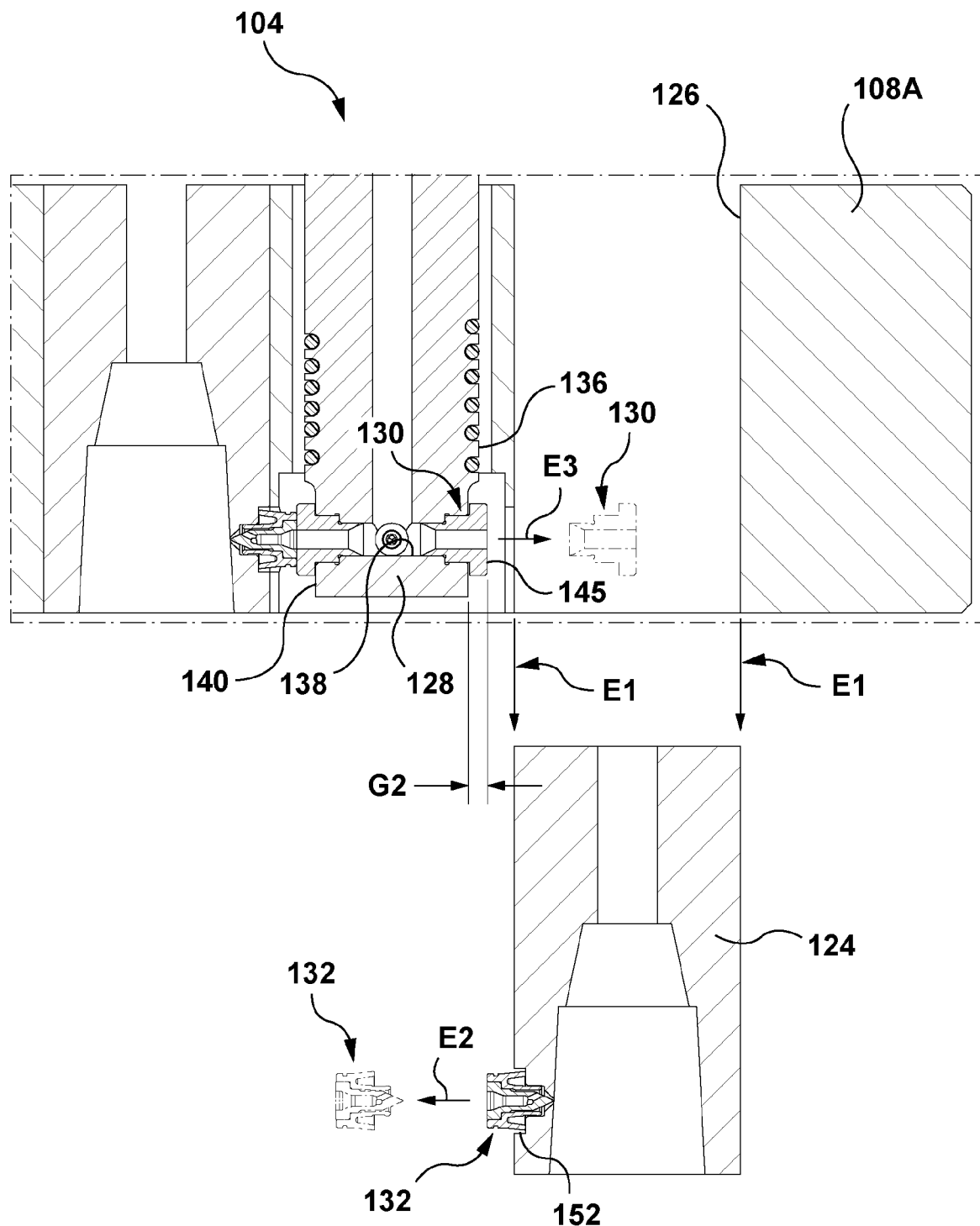
FIG. 5 is an enlarged view of a portion 5 of FIG. 1 showing a cavity member, with a tip assembly installed therein, removed from the injection molding apparatus.

Referring now to FIG. 5 which is an enlarged view of a portion 5 of FIG. 1 showing cavity insert 124, with tip assembly 132 installed therein, removed from injection molding apparatus 100. To facilitate servicing or replacement of tip assembly 132 and/or transfer member 130, cavity insert 124 is extracted from bore 126 in first mold plate 108A in the direction E1. Tip assembly 132, which is received in cavity insert 124, travels with cavity insert 124 as it is extracted. While cavity insert is being extracted, flange 152 supports tip assembly 132 against lateral tipping. Closely sizing bore 138 and portions of transfer member 130 received therein not only promotes heat transfer from nozzle body 128 to transfer member 130, it also helps to support transfer member 130 against side loading within bore 138 as cavity insert 124 and tip assembly 132 received therein are removed from first mold plate 108A. Transfer member 130 projects beyond side wall 140, such that bearing surface 145 is located beside and spaced apart from sidewall 140 of nozzle body 128 by a gap G2. This configuration allows cavity insert 124 and tip assembly 132 received therein to be slidably separated (i.e. displaced downward in the direction E1) from transfer member 130, without interfering with nozzle body 128.

With cavity insert 124 extracted from first mold plate 108A, tip assembly 132 can be extracted from cavity insert 124 as shown by arrow E2. With cavity insert 124 removed from first mold plate 108A, transfer member 130 can be extracted from bore 138 in nozzle body 128 as shown by arrow E3.

Figure 6:
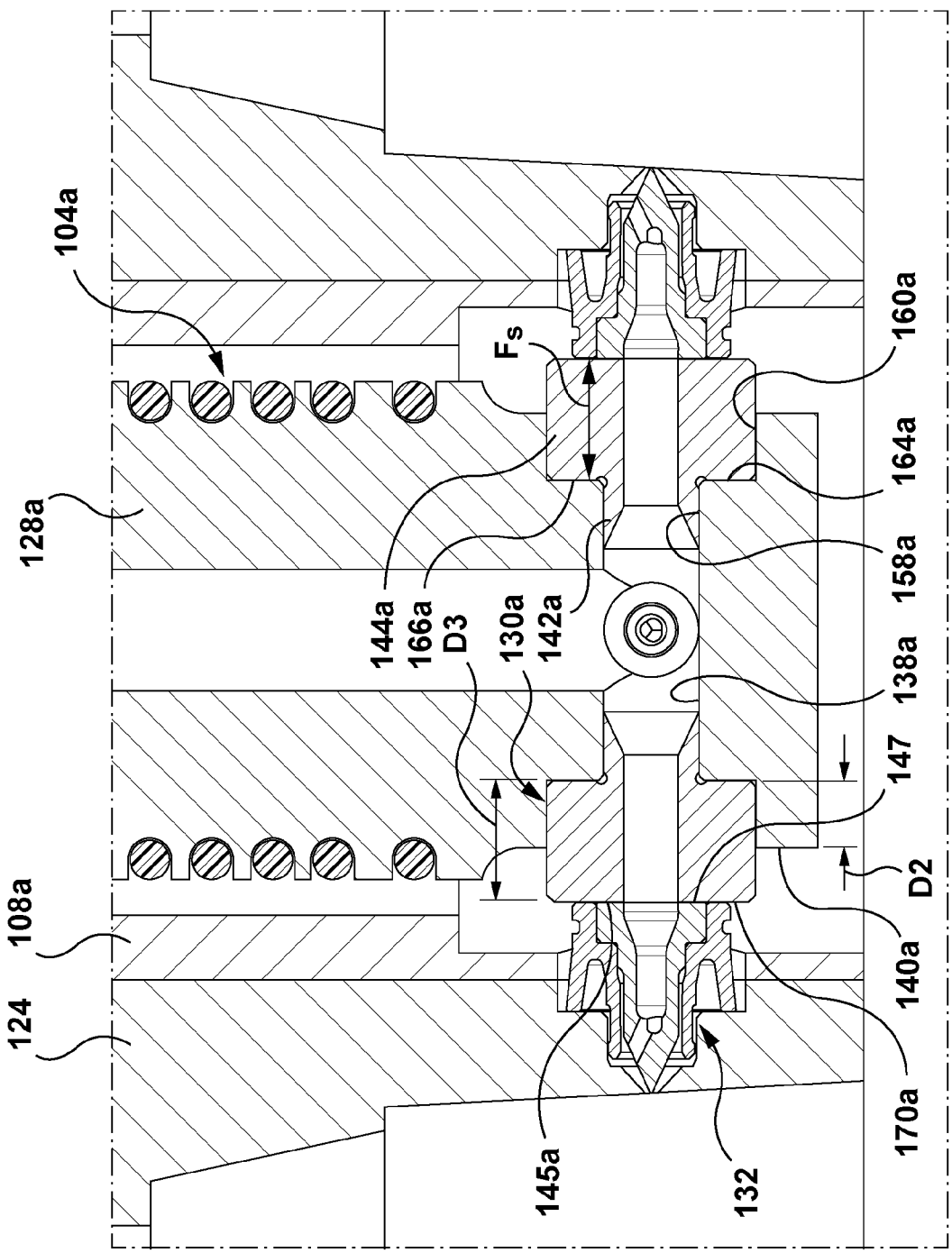
FIG. 6 is an enlarged view of portion 3 of FIG. 2 showing a downstream end of a side-gate nozzle in accordance with another embodiment of the present application.

Referring now to FIG. 6, which is an enlarged view of portion 3 of FIG. 2 showing a downstream end of a nozzle 104a in accordance with another embodiment of the present application. Nozzle 104a includes a transfer member 130a having an extension portion 142a and a biasing portion 144a. Unlike transfer member 130 in the illustrated embodiments of FIGS. 1-3, transfer member 130a, does not include a flange or a second shoulder formed thereby as does transfer member 130 in the illustrated embodiments of FIGS. 1-3.

A nozzle body 128a of nozzle 104a includes a bore 138a having a first lateral portion 158a sized to receive extension portion 142a and a second lateral portion 160a sized to receive biasing portion 144a. Bore 138a includes a step 164a between first lateral portion 158a and second lateral portion 160a, and transfer member 130a includes a shoulder 166a between extension portion 142a and biasing portion 144a. Transfer member 130a is seated against step 164a and lengthwise thermal expansion of transfer member 130a urges tip assembly 132 away from nozzle body 128a, towards cavity insert, 124, to apply a sealing force $F_S$ against abutment surface 147 of tip assembly 132.

In comparison to the illustrated embodiment of FIGS. 1-3, the surface area of bearing surface 145 is equal to or substantially equal to that of bearing surface 145a in FIG. 6; however, since transfer member 130a lacks a flange, shoulder 166a and step 164a each have a larger surface area than shoulder 166 and step 164 of the illustrated embodiment of FIGS. 1-3. The larger surface areas of step 164a and shoulder 166a increases the overall interface area between transfer member 130a and bore 138a which may improve heat transfer between nozzle body 128a and transfer member 130a while maintaining the size of bearing surface 145a.

The longitudinal distance D3 between shoulder 166a and bearing surface 145a is greater than the longitudinal distance D2 between step 164a and side wall 140a of nozzle body 128a. In this configuration transfer member 130a projects beyond side wall 140a, such that bearing surface 145a is located beside and spaced apart from nozzle body 128a. Similar to the embodiment described with regard to FIGS. 1-3, this configuration allows cavity insert 124 and tip assembly 132 received therein to be separated (i.e. displaced downward as shown on the pageview of FIG. 6) from transfer member 130a, for example, to facilitate maintenance such as replacing a tip assembly 132, without interfering with nozzle body 128a.

Although bore 138, transfer member 130 and tip assembly 132 are described in singular form, as shown in the illustrated embodiments, nozzle 104 includes a plurality of bores 138 that extend outward from nozzle channel 136 and through nozzle body 128, each bore 138 having a respective transfer member 130 seated therein to apply sealing force against a respective tip assembly 132. The plurality of bores 138, are angularly spaced evenly around nozzle body 128 to counteract thermal expansion forces oppositely facing transfer members 130 against their respective tip assembly 132 and its associated cavity insert 124. Alternatively, nozzle 104 can include a single bore 138, transfer member 130, and tip assembly 132. In this configuration, a spacer (not shown) is positioned on the opposite side of nozzle body 128 from bore 138, between nozzle body 128 and a mold component to counter act thermal expansion forces experienced by transfer member 130 against its tip assembly 132 and its associated cavity insert 124.

In the illustrated embodiments shown herein side wall 140 of nozzle body 128 from which bore 138 extends is a planar side surface of nozzle body 128. This configuration can reduce the width of nozzle body 128 in the area surrounding bore 138, which can reduce the tip-to-tip spacing of an oppositely facing pair of tip assemblies 132.

While various embodiments have been described above, they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments but should be defined only in accordance with the appended claims and their equivalents. It will also be understood that features of each embodiment discussed herein can be used in combination with the features of other embodiments.

What is claimed is:

1. A side-gate nozzle comprising:
   a nozzle body having a heater, a nozzle channel extending longitudinally into the nozzle body, and a bore in the nozzle body extending from an exterior side wall of the nozzle body to the nozzle channel, the bore includes a first lateral portion, a second lateral portion, and a step between the first lateral portion and the second lateral portion, the first lateral portion located closer to the nozzle channel than the second lateral portion;
   a nozzle tip having a tip member, a tip channel extending through the tip member, and a sealing member in which the tip member is received; and
   a transfer member comprising:
      a bearing surface against which an abutment surface of the nozzle tip is slidably abutted;
      a transfer channel extending therethrough in fluid communication between the nozzle channel and the tip channel;
      a biasing portion having the bearing surface against which the abutment surface of the nozzle tip is seated, the biasing portion received within the second lateral portion;
      an extension portion projecting from the biasing portion, the extension portion received within the first lateral portion; and
      a shoulder between the biasing portion and the extension portion, the shoulder seats against the step,
   wherein, in operation, thermal expansion of the transfer member along its length applies a sealing force against the abutment surface of the nozzle tip.

2. The side-gate nozzle of claim 1, wherein the first lateral portion of the bore in the nozzle body is sized to slidably receive the extension portion of the transfer member.

3. The side-gate nozzle of claim 1, wherein the second lateral portion of the bore in the nozzle body is sized to slidably receive the biasing portion of the transfer member.

4. The side-gate nozzle of claim 1, wherein an upstream end of the transfer channel includes a flared portion defined by an internal tapered surface of transfer member.

5. The side-gate nozzle of claim 1, wherein a longitudinal distance between the shoulder of the transfer member and the bearing surface of the transfer member is greater than the longitudinal distance between the step in the bore and the exterior side wall of the nozzle body.

6. The side-gate nozzle of claim 1, wherein the step is perpendicular to the first lateral portion and the second lateral portion, and the shoulder is perpendicular to the extension portion and the biasing portion.

7. The side-gate nozzle of claim 1, wherein the transfer member includes a flange at its downstream end and another shoulder between the biasing portion and the flange.

8. The side-gate nozzle of claim 7, wherein the longitudinal distance between the shoulder and the another shoulder is greater than the longitudinal distance between the step in the bore in the nozzle body and the exterior side wall of the nozzle body.

9. The side-gate nozzle of claim 7, wherein the another shoulder is perpendicular to the biasing portion.

10. The side-gate nozzle of claim 1, wherein the transfer member projects beyond the exterior side wall such that the bearing surface is spaced apart from the nozzle body.

11. The side-gate nozzle of claim 1, wherein the exterior side wall of the nozzle body to which the bore in the nozzle body extends is a planar exterior side wall portion of the nozzle body.

12. The side-gate nozzle of claim 1, wherein the transfer member is made from a material that is more thermally conductive than the material from which the nozzle body is made.

13. The side-gate nozzle of claim 1, wherein the transfer member is made from a material that has a greater coefficient of thermal expansion than the material from which the nozzle body is made.

14. The side-gate nozzle of claim 1, wherein the tip member is made from a material having a thermal conductivity that is equal to or more than that of the material from which the transfer member is made.

15. The side-gate nozzle of claim 1, wherein the tip member is made from a material that has a greater coefficient of thermal expansion than the material from which the sealing member is made.

16. The side-gate nozzle of claim 1, wherein the bore in the nozzle body extends perpendicularly from the nozzle channel.

17. A side-gate hot runner system comprising:
   a manifold having a manifold heater and a manifold channel having a manifold inlet at its upstream end for receiving moldable material from a source and a manifold outlet at its downstream end, the manifold channel in fluid communication with a side gate nozzle according to claim 1.

* * * * *